United States Patent [19]

Vacher

[11] 3,784,871

[45] Jan. 8, 1974

[54] CIRCUIT ARRANGEMENT FOR GENERATING A SAWTOOTH CURRENT THROUGH A DEFLECTION COIL

[75] Inventor: Pierre Vacher, St-Germain-en-Laye, France

[73] Assignee: U.S. Philips Corporation, New York, N.Y.

[22] Filed: Apr. 13, 1972

[21] Appl. No.: 243,639

[30] Foreign Application Priority Data

May 4, 1971 France .............................. 7116044

[52] U.S. Cl. .............................. 315/27 TD, 315/29

[51] Int. Cl. .............................. H01j 29/70

[58] Field of Search .............................. 315/27 TD, 29

[56] References Cited

UNITED STATES PATENTS

| | | | |
|---|---|---|---|
| 3,189,782 | 6/1965 | Heffron | 315/27 TD |
| 3,210,601 | 10/1965 | Walker | 315/27 TD |
| 3,366,807 | 1/1968 | Heffron | 315/27 TD |
| 3,626,238 | 12/1971 | Forster | 315/27 TD X |
| 3,449,623 | 6/1969 | Dietz | 315/27 R |

*Primary Examiner*—Carl D. Quarforth
*Assistant Examiner*—P. A. Nelson
*Attorney*—Frank R. Trifari

[57] ABSTRACT

A circuit arrangement for generating a sawtooth current through a deflection coil including two switches. The series network of an inductor and a capacitor is arranged between the two switches, while a second inductor is arranged between the supply source and a junction of one switch and the series network. The network constituted by the two inductors and the capacitor has a resonant frequency which is preferably between 0.5 and 0.8 times the repetition frequency of the sawtooth current (the line frequency) and the said switch is a unipolar switch (a thyristor).

6 Claims, 3 Drawing Figures

CIRCUIT ARRANGEMENT FOR GENERATING A SAWTOOTH CURRENT THROUGH A DEFLECTION COIL

The invention relates to a circuit arrangement for generating a sawtooth current through a deflection coil, comprising a first and a second switch, the series network of a first inductor and a capacitor which is arranged between an electrode of the first switch and an electrode of the second switch and a second inductor which is arranged between the said electrode of the second switch and a terminal of a voltage supply source.

Such a circuit arrangement is described in U.S. Pat. No. 3,449,623 which arrangement is used for the line deflection in a television receiver and in which both switches are bipolar and are constituted by a thyristor and a diode connected antiparallel therewith. The output and reliability of the known circuit arrangement may be considered to be satisfactory. A drawback is, however, that the second thyristor must have a very high switching speed due to its short blocking period without a reverse voltage facilitating blocking simultaneously. As a result this thyristor is an expensive component.

An object of the present invention is to provide a circuit arrangement whose properties, output and reliability are not detrimentally influenced by the fact that the said thyristor is of moderate quality. To this end the circuit arrangement according to the invention is characterized in that the resonant frequency of the network constituted by the first and the second inductor and the capacitor is lower than the repetition frequency of the sawtooth current and is higher than approximately half this frequency and that the second switch is a unipolar switch.

Due to the step according to the invention a reverse voltage prevails across the second switch for a given period sufficient to deplete the charge carriers stored in the semiconductor junctions while the forward voltage gradually increases. Also a larger energy can be taken up from the supply source.

Figure 1:
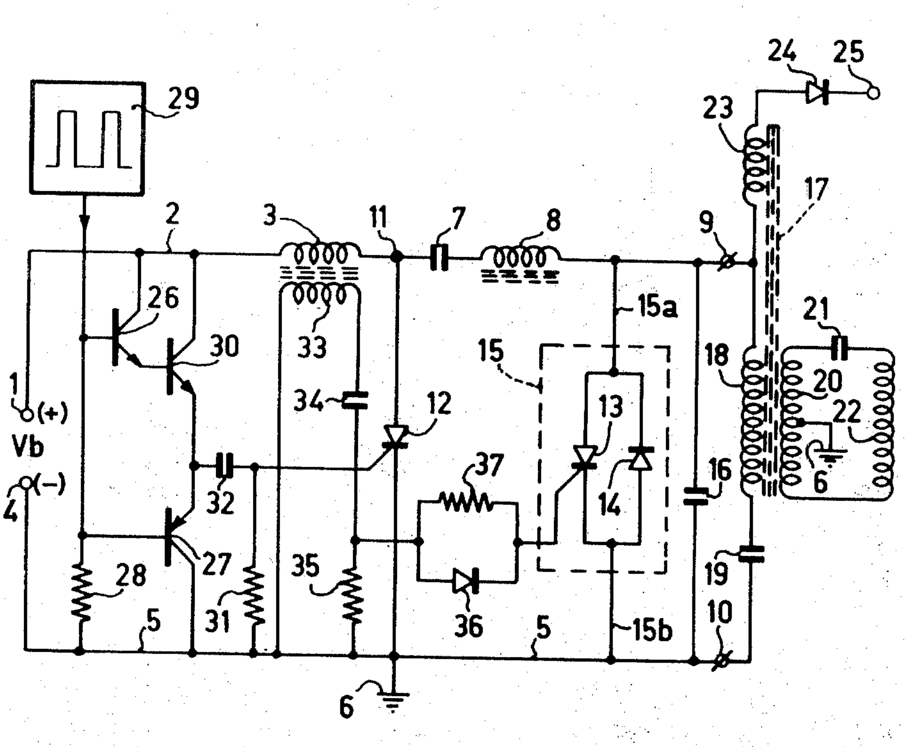
Figure 2:
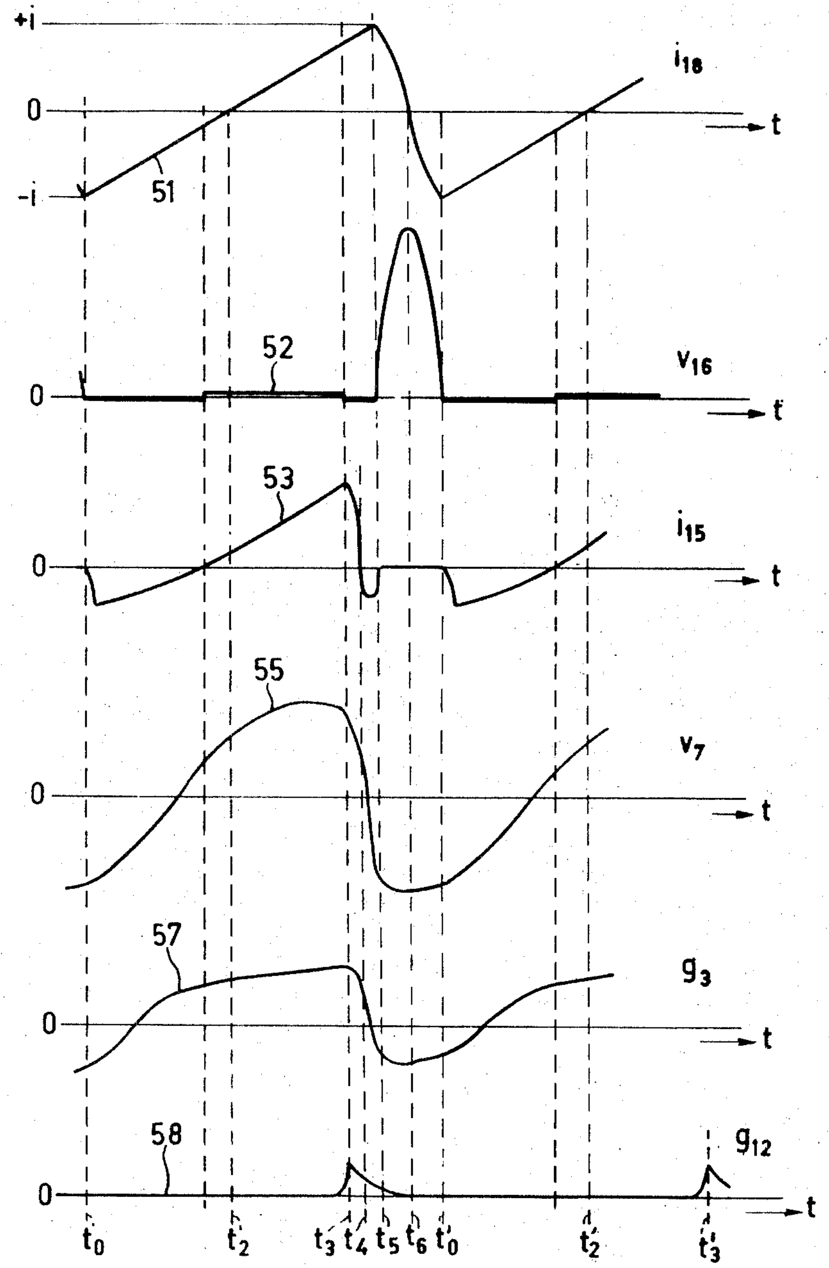
Figure 3:
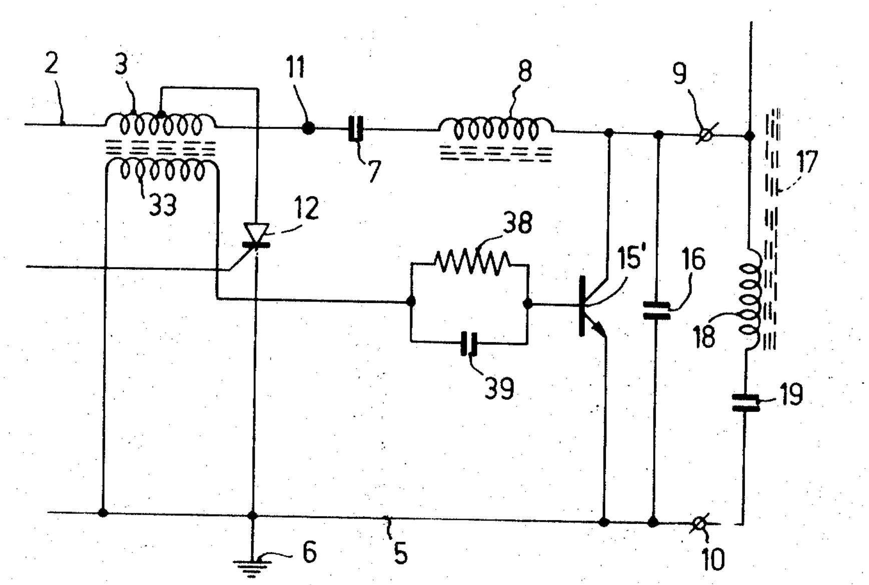

In order that the invention may be readily carried into effect some embodiments thereof will now be described in detail by way of example with reference to the accompanying diagrammatic drawing in which FIG. 1 shows the principle circuit diagram of a circuit arrangement according to the invention and FIG. 2 shows waveforms occurring in the circuit arrangement, and FIG. 3 shows a further embodiment of the arrangement according to the invention.

In FIG. 1 the positive terminal 1 of a voltage supply source $V_b$ is connected through a lead 2 to an inductor 3, while the negative terminal 4 of source $V_b$ is connected through a lead 5 to ground 6 and to a terminal 10. The other end 11 of inductor 3 is connected through the series arrangement of a capacitor 7 and an inductor 8 to a further terminal 9 and to the anode of a thyristor 12 whose cathode is connected to ground.

A bipolar switch 15 is arranged between terminals 9 and 10 via two leads *15a and 15b*, which switch consists of a thyristor 13 and a diode 14 connected anti-parallel therewith, the cathode of thyristor 13 and the anode of diode 14 being connected to lead 5. A tuning capacitor 16 is also arranged between terminals 9 and 10, as well as the series arrangement of the primary winding 18 of the line output transformer 17 and of a capacitor 19 of high capacitance. A central tap on a secondary winding 20 of transformer 17 is connected to earth while the ends thereof are connected through a capacitor 21 to the line deflection coil 22. Transformer 17 is also provided with an EHT winding 23 which is arranged between terminal 9 and the anode of a rectifier 24 whose cathode is connected to the acceleration anode 25 of a television display tube (not shown).

The gate of thyristor 12 is controlled by a circuit comprising an npn-transistor 26, a pnp-transistor 27 and an npn-transistor 30. The collectors of transistor 26 and 30 are connected to lead 2 and those of transistor 30 are connected to lead 5. The bases of transistors 26 and 27 are connected together and through a resistor 28 to lead 5 and they are controlled by the pulses of line frequency originating from a pulse generator 29. The emitter of transistor 26 drives the base of transistor 30 whose emitter is directly connected to the emitter of transistor 27 and both emitters are coupled through a capacitor 32 to the gate of thyristor 12 while this gate is connected to earth through a leakage resistor 31.

The control circuit of the gate of thyristor 13 includes a winding 33 magnetically coupled to inductor 3, one end of said winding being directly connected to lead 5 and the other end being connected to lead 5 through the series arrangement of a capacitor 34 and a resistor 35. This gate is connected to the junction of capacitor 34 and resistor 35 through the parallel arrangement of a diode 36 and a resistor 37, the cathode of diode 36 being connected to the gate.

The operation of the circuit arrangement of FIG. 1 may be described as follows. Capacitor 19 has a high capacitance and behaves as a constant voltage source. Switch 15 has for its object to connect to this source the inductor which is "seen" from the ends of primary winding 18 and which is an equivalent inductor which also includes the other windings of transformer 17 as well as deflection coil 22. For the sake of simplicity, it will hereinafter be assumed that this equivalent inductor is represented by primary winding 18. During the scan switch 15 conducts so that the current $i_{18}$ through winding 18 varies linearly from a negative intensity $-i$ to a positive intensity $+i$. Curve 51 in FIG. 2 shows this variation in which instants $t_o$ and $t_5$ denote the commencement and the end, respectively, of the scan. Current $i_{18}$ becomes zero at the instant $t_2$; during part of the period $t_0$ to $t_5$ current $i_{18}$ flows through diode 14 and during the remaining part it flows through thyristor 13 which, due to a positive control voltage, can conduct (see curve 57 in FIG. 2).

Switch 15 stops conducting at instant $t_5$ and circuit 16, 18 oscillates freely. Capacitor 16 is chosen to be such that current $i_{18}$ varies between $+i$ and $-i$ during the flyback period $t_5$ to $t'_0$ in FIG. 2.

The gate of thyristor 12 receives a pulse at an instant $t_3$ prior to instant $t_5$ (see curve 58 in FIG. 2 which represents the voltage $g_{12}$ at this gate) so that the thyristor conducts. The series network 7, 8 is short-circuited by the two thyristors so that free oscillation on the comparatively high resonant frequency determined by these components is initiated. In addition to current $i_{18}$, the current $i_8$ produced by this oscillation and having a direction opposite to that of current $i_{18}$ also flows through thyristor 13. Current $i_8$ becomes equal to current $i_{18}$ at an instant $t_4$ so that thyristor 13 is blocked. Current $i_8$ then flows through diode 14 while current $i_{18}$ continues to increase linearly until instant $t_5$. Curve 53 in FIG. 2 shows the variation of the current flowing through leads 15*a* and 15*b* and reversing its direction at instant $t_4$.

After instant $t_4$ current $i_8$ still increases, reaches a maximum and subsequently decreases. Current $i_8$ and current $i_{18}$ become again equal at instant $t_5$ so that diode 14 is blocked. Thyristor 13 remains blocked because its gate is negative (see curve 57 in FIG. 2). Circuit 16, 18 then oscillates freely so that capacitor 16 is charged to a voltage which is several times higher than the voltage across capacitor 19. Simultaneously the deflection current decreases, becomes zero at approximately the instant $t_6$ when the voltage across capacitor 16 is at a maximum (see curves 51 and 52 in FIG. 2) and subsequently reverses its direction. At the end of the half period of this free oscillation, at instant $t'_o$, the deflection current again assumes the intensity $-i$, while the voltage across capacitor 16 is substantially zero. Due to the presence of diode 14 this voltage cannot reverse its polarity. The flyback period is ended at instant $t'_o$ and a new scan period is initiated.

After instant $t_5$ current $i_8$ decreases and becomes zero at approximately the instant $t_6$: the voltage $v_7$ across capacitor 7 is then at a maximum (see curve 55 in FIG. 2). Subsequently current $i_8$ reverses its direction. Consequently, for the variation of the deflection current the variation of current $i_8$ must be taken into account during the flyback period. In FIG. 2 the variation of current $i_8$ has been neglected for the variation of curve 51 for the sake of simplicity. This is permitted because the linearity of current $i_{18}$ is not influenced by current $i_8$ during the scan period. Shortly after instant $t_6$ this current is equal in absolute value and opposite in direction to the current which maintains thyristor 12 conducting from instant $t_3$ through lead 2 and inductor 3. As a result this thyristor is blocked. Inductor 3 is then arranged in series with the rest of the circuit arrangement. At the instant $t'_o$, when the scan period is initiated, switch 15 conducts. The energy stored in capacitor 7 causes a free oscillation which is determined from instant $t'_o$ by inductors 3 and 8 and by capacitor 7 and which therefore has a lower resonant frequency than the frequency which applies before instant $t_6$. According to the invention this frequency is chosen to have a value which is approximately 0.5 to 0.8 times the line frequency. As is shown by curve 55 in FIG. 2, the voltage across capacitor 7 reverses its polarity during the scan period and becomes positive. From the instant shortly after instant $t_6$ when thyristor 12 is blocked until the instant $t'_3$, which corresponds to instant $t_3$ of the previous period, network 3, 7, 8 thus remains connected to the voltage supply source and capacitor 7 is charged.

Curve 58 in FIG. 2 shows the variation of the voltage $g_{12}$ at the gate of thyristor 12. The pulses of line frequency originating from generator 29 are amplified by the Darlington-amplifier constituted by transistors 26 and 30 whereafter they drive the gate of thyristor 12. Transistor 27 clamps the potential of the gate at the zero level during the time interval between the pulses. Curve 57 in FIG. 2 shows the variation of voltage $g_{13}$ at the gate of thyristor 13. This variation is determined by elements 33, 34, 35, 36 and 37 and is such that voltage $g_{13}$ becomes positive during the first half of the scan period so that thyristor 13 can conduct from the instant, prior to instant $t_2$, when current $i_8$ and current $i_{18}$ have the same intensity in absolute value (see curve 53).

In the circuit arrangement according to the invention the flyback period is determined by capacitor 16 and winding 18. In the known arrangement, however, in which capacitor 16 is absent, this period is inter alia determined by capacitor 7 which capacitor is also employed to transfer energy from the supply source to winding 18. In the circuit arrangement according to the invention, the freedom of choice is therefore greater as regards capacitor 7 and as regards the design of transformer 17. In addition, capacitor 7 in the known circuit arrangement is charged after an instant $t_1$ just after the commencement of the scan period, which is an instant when the voltage thereacross has already a considerable positive value. This is apparent from curve E in FIG. 2 of the said U.S. Patent Specification. After instant $t_1$ this voltage varies at low frequency in the order of 3 kHz at a line frequency of 15,750 Hz so that the voltage increase during the period $t_1$ to $t_3$ is comparatively small. The energy derived from the supply source and which is to be transferred to winding 19 is therefore limited. In the circuit arrangement according to the invention capacitor 7 is connected to the supply source from the instant prior to the commencement of the scan period when thyristor 12 no longer conducts, at which instant (see curve 55) the voltage across capacitor 7 is highly negative. Since the resonant frequency of the series network 3, 7, 8 has the given value, this voltage is highly positive at instant $t'_3$. In fact, when the own frequency of network 3, 7, 8 is approximately 0.6 times the line frequency (which is 15,625 Hz for 625 lines per raster) the half period thereof is approximately 52 $\mu$s, i.e. voltage $v_7$ is approximately maximum positive at instant $t'_3$ which occurs approximately 52 $\mu$s after instant $t_6$. With a factor of 0.5 or 0.8 voltage $v_7$ at instant $t'_3$ is still approximately half of the said maximum. The energy transfer is therefore considerably greater than in the known circuit arrangement, which is comportant because transformer 17 must be able to supply very large powers to deflection coil 22, EHT winding 23 and to further secondary windings not shown in FIG. 1. It may also be noted that capacitor 7 in the circuit arrangement according to the invention is connected to the supply source for a longer period than that in the known circuit arrangement, namely from approximately the middle of the flyback period instead of from the said instant $t_1$, so that losses can be better compensated for.

Another advantage is that thyristor 12 in the relevant circuit arrangement is at a negative voltage during a great part of the period so that the charge carriers stored in the semiconductor junctions can be readily depleted while the forward voltage increases quite gradually. After instant $t'_o$ the voltage at point 11 is substantially equal to the voltage prevailing across capacitor 7. Under these circumstances the circuit arrangement described can operate satisfactorily without the thyristor 12 having to meet very stringent requirements. In contrast therewith the relevant thyristor in the known circuit arrangement must be of a very high quality because the charge carriers must be depleted in a comparatively short period while there is substantially no negative voltage facilitating this process, whereafter a positive voltage is very rapidly applied which involves the risk of the thyristor becoming responsive too early.

Since the own frequency of the series network 3, 7, 8 is comparatively high, the inductance of inductor 3 may be reduced in the circuit arrangement according to the invention. This step itself is not only advantageous but the same energy ½ $Li^2$ may thereby be supplied by a lower supply voltage, for example, 50 V instead of 150V.

Since there is greater freedom in the choice of the value of the supply voltage, the embodiment of FIG. 3 is possible. In this embodiment switch 15 is formed by a transistor 15' which can stand high voltages, such as, for example, the Philips type BU 108. An advantage thereof is that the base-collector doide of transistor 15' can fulfil the function of diode 14, so that this diode is no longer required. All this is further described in U.S. Pat. No. 3,504,224. The control means for transistor 15' consist of winding 33 in series with the parallel arrangement of a resistor 38 and a capacitor 39. As is known, the linearity error introduced bu the dual action of transistor 15' is very small, provided that the supply voltage is fairly high. Another advantage of this embodiment is that the impedance levels may be chosen to be such that the series arrangement of capacitor 21 and deflection coil 22 can be directly connected between terminals 9 and 10. With a view to the higher supply voltage, the anode of thyristor 12 in the circuit arrangement of FIG. 3 is not connected to point 11, but to a tap on winding 3.

It may be noted that circuit arrangements are known in which capacitor 7 is replaced by a plurality of capacitors. It will be evident that the principle of the invention can also be used in such a case.

What is claimed is:

1. A circuit for generating a sawtooth current having a selected repetition frequency for a deflection coil, said circuit comprising first and second switching means, means coupled to said second switching means for receiving and applying thereto a control signal having said selected repetition frequency, said second switching means comprising a unipolar switch, each of said switching means comprising first and second terminals; a series network comprising a first inductor and a first capacitor coupled between said first terminals; a second inductor having a first end coupled to said second switch first terminal and a second end adapted to receive a first lead of a voltage supply source; first means coupling said second terminals to a second lead of said source; second means for coupling said deflection coil to said first switch; said first and second inductors and said first capacitor comprising a resonant circuit having a resonant frequency lower than approximately said repetition and higher than approximately one half of said repetition frequency.

2. A circuit as claimed in claim 1 wherein said resonant frequency is approximately between 0.5 and 0.8 times said repetition frequency.

3. A circuit as claimed in claim 2 wherein said resonant frequency is substantially equal to 0.6 times said repetition frequency.

4. A circuit as claimed in claim 1 wherein said second coupling means comprises a transformer having a secondary adapted to be coupled to said deflection coil, and a primary; a second capacitor series coupled to said primary; and a third capacitor parallel coupled to said second switch and to said second capacitor and said primary.

5. A circuit as claimed in claim 1 wherein said second switch comprises a thyristor.

6. A circuit as claimed in claim 1 wherein said first switch comprises a transistor having a large forward current capacity base-emitter path.

* * * * *